United States Patent [19]

Swartout

[11] 4,341,001
[45] Jul. 27, 1982

[54] HUB FOR USE IN FLYWHEELS FOR KINETIC ENERGY STORAGE

[75] Inventor: Bruce E. Swartout, San Juan Capistrano, Calif.

[73] Assignee: U.S. Flywheels, Inc., Irvine, Calif.

[21] Appl. No.: 176,746

[22] Filed: Aug. 11, 1980

Related U.S. Application Data

[62] Division of Ser. No. 942,054, Sep. 13, 1978, abandoned.

[51] Int. Cl.³ ............... B21K 1/40; B21K 1/28; B60B 9/26; B60B 27/00
[52] U.S. Cl. ................... 29/159.3; 29/463; 74/572; 301/105 R
[58] Field of Search ............ 74/572; 29/159 R, 159.3, 29/463; 301/105 R, 106, 107

[56] References Cited

U.S. PATENT DOCUMENTS

| | | | |
|---|---|---|---|
| 383,966 | 6/1888 | Maurino | 301/106 |
| 1,385,231 | 7/1921 | Skolnik | 29/159.3 |
| 1,451,818 | 4/1923 | Forster | 74/572 |
| 1,838,322 | 12/1931 | Murray, Jr. | 29/159 R UX |
| 3,004,326 | 10/1961 | Merz | 29/463 X |
| 3,368,424 | 2/1968 | Clerk | 74/572 |
| 4,036,080 | 7/1977 | Friedericy | 74/572 |
| 4,176,563 | 12/1979 | Younger | 74/572 |

FOREIGN PATENT DOCUMENTS

| | | | |
|---|---|---|---|
| 1299451 | 6/1962 | France | 29/463 |
| 216548 | 5/1924 | United Kingdom | 74/572 |

Primary Examiner—Lowell A. Larson
Attorney, Agent, or Firm—Fischer, Tachner & Strauss

[57] ABSTRACT

A unitary hub and method of fabricating such a hub for use in conjunction with flywheels for inertial energy storage apparatus, the hub having a double convex domed configuration cut into double spider leg shape upon which a flywheel rim, such as one comprising fiber composite material, may be wound directly. The hub further comprises two cylindrical bars affixed to the center of the outer convex surfaces of the oppositely facing domes to form axles of the hub, and two similar bars which are affixed to the center of the inner concave oppositely facing surfaces of the hub domes to form height limiting devices. Vertical height increasing stress is applied to the hub, resulting in a decrease in the hub diameter. A fiber composite material rim may be wound upon the circumferential perimeter of the hub. This stationary height increased configuration of the hub permits the unitary structure to increase in diameter at high rotational velocities when subjected to severe centrifugal forces. As a result, destructive metal fatigue is precluded by a re-direction and distribution of centrifugal force induced stresses within the legs of the hub. Separation between a fiber material rim of lower modulus of elasticity and the hub is also precluded, thereby preventing dynamic instability of the flywheel at high speeds of rotation. The pre-stressed height increase also results in a greater hub spring constant during rotation and thus adds further to the dynamic stability of the flywheel.

5 Claims, 13 Drawing Figures

HUB FOR USE IN FLYWHEELS FOR KINETIC ENERGY STORAGE

This is a division of application Ser. No. 942,054 filed Sept. 13, 1978, now abandoned.

CROSS-REFERENCES TO RELATED APPLICATIONS

Patent application Ser. No. 942,112 now U.S. Pat. No. 4,285,251, filed concurrently herewith, and patent application Ser. No. 945,104, filed on Sept. 25, 1978, both pertain to related subject matter.

BACKGROUND OF THE INVENTION

This invention relates generally to flywheels used for kinetic energy storage and more specifically to a low mass, variable stress-distribution hub used in such flywheels.

The principle of the flywheel, which has been recognized for a very long time, is that a spinning wheel stores mechanical energy. Until recently, it was thought that employing flywheels to store energy for modern technological applications was out of the question because of the cost and the low efficiency of energy storage as compared to flywheel weight. However, this picture has been radically changed by recent advances in materials technology and in flywheel design.

The amount of energy stored in a flywheel depends upon the mass of the rim and the angular velocity of the wheel. Energy storage varies as the square of the rotational velocity. In theory, the amount of energy that may be stored in a given flywheel may be increased indefinitely with the speed of the flywheel. However, as is well known in the art, there is a limit to the amount of energy that may be stored in a given flywheel which is dependent upon the tensile strength of the material from which the flywheel is constructed and the manner in which the various stresses that are created are distributed in the flywheel. For example, it has been determined that for a given flywheel weight, the best material for storing the most energy consists of a material which is of extremely low density to reduce the stresses in the wheel and which is extremely strong to withstand the stresses that are created. In so far as flywheel design is concerned, it is also known that the mass located towards the rim of the wheel contributes far greater to the energy storage than mass located towards the center of the wheel.

Flywheels have traditionally been made of metal such as high strength steel. However, because of its high density, steel is not suitable for making a flywheel capable of storing large amounts of energy for a given weight flywheel. It has been found that materials comprising a composite of fiber have much more suitable properties for flywheel construction. Such fiber composite materials are much lower in density than steel, while being at least equally strong and far stronger in some cases than the strongest steel alloys. Although advantageous as compared to steel or steel alloy rims, rims comprising fiber composite materials do present certain disadvantages of their own. For example, because fiber composite material rims typically have a lower modulus of elasticity then the remaining portions of the flywheel, the fiber composite rim may expand away from a hub causing dynamic imbalance in the flywheel. The present invention precludes this problem and thus overcomes a major disadvantage of the prior art by a unique geometrical design which permits the higher modulus metal hub to expand during high speed rotation, an amount equivalent to the expansion of the fiber composite. This equalization of expansion permits retention of a firm contact between the inner portion of the fiber composite rim and the outer surface of the hub and thus maintains dynamic stability of the flywheel.

Also traditional in flywheel construction has been the use of mutli-element structures including a centrally located hub which is used to interface the flywheel with the source of rotational input energy as well as with the means of transferring output energy stored in the flywheel. Also included have been the rim portion of the flywheel and inter-connecting devices to secure the rim to the hub. Such multi-piece construction results in a number of disadvantages including the added expense of production and the inferior dynamic stability of the rotating flywheel. In addition, the mass of the connectors and hub add greatly to the inefficiency of energy storage for a given weight flywheel and thus even more, add to the cost of a flywheel for a given amount of energy storage.

The present invention also overcomes the disadvantages derived from multi-element construction by providing a low mass single piece axle and hub upon which a fiber composite material rim may be directly connected without any interconnecting devices.

SUMMARY OF THE INVENTION

The present invention is a unique flywheel hub designed to be used compatibly with composite fiber material rims and which precludes a need for connectors that interface the hub and the rim. This novel hub is extremely lightweight and, because of its unitary design, is substantially cheaper to produce. In addition, the present invention provides a hub of unique geometrical configuration that both minimizes and advantageously distributes the stresses created in the hub despite the high rotational velocity of the flywheel. In the present invention, the hub and axle of the flywheel are integrated as one piece suitable for having fiber wound directly upon it to form the rim. The hub is in a double spider shaped, dome configuration, giving it built-in expandability and providing for restoring forces which compensate for possible imbalance and dynamic instability in the flywheel.

The hub comprises two circular metallic sections, such as 7075 T-6 aluminum plate stock, each stamped into a saucepan-shaped configuration. A cylindrical metallic bar is affixed to the inner-surface of each such section by welding or the like. The saucepan shaped sections are brought together and permanently joined, also by welding or the like, leaving a gap of predetermined length between the two cylindrical bars that are positioned collinearly between the domed portions of the double saucepan portions. The domed portions of the double saucepan configuration of the hub are then cut, leaving a relatively small portion of the original mass of the hub in the form of a plurality of interconnected legs that may be described as a double spider arrangement.

Similar cylindrical bars are applied, one each, to the centers of the outer-surface of each of the two domes of the hub and are fixed thereto by welding or the like. These outer cylindrical bars are used as axles and also to apply tension stress to the respective domed surfaces which has the effect of increasing the overall height of the domed spider hub. Hydraulically pulling in opposite directions by holding the two cylindrical bars (or by hydraulically jacking the inside center of the hub), has the effect of increasing the overall height of the domed spider hub and diametrically shortening the outer portion of the spider legs. By inserting a metal block in the gap between surfaces of the cylindrical bars or between the inner surfaces of the hub, the domed portion of the spider legs are held in a state of pre-stress, enabling the release of the hydraulic jack, or other device, which increased the height of the hub. It is in this condition of increased height that the composite fiber rim is wound onto the hub. As the flywheel increases its angular velocity the height of the hub decreases, which gradually relieves the pre-stress state. This superposition of pre-stress and inertial load stresses not only accommodates the growth of the lower modulus composite fiber rim, eliminates any other connecting devices and thus permits higher rotational speed, but also assures a growth sufficient to retain an allowable compressive force on the inside of the composite rim such that an adequate spring constant between the hub and rim is maintained to insure its dynamic stability. The hub height increase and diameter reduction may be accomplished by also employing radially compressive force to the vertical legs as long as a maximum stress, 68,000 psi. in 7075 T-6 aluminum, is not exceeded.

As the stresses of centrifugal force increase, the two internally positioned cylindrical bars grow towards each other, thereby reducing the size of the gap between them until the cylindrical bars eventually come in contact with each other, completely closing the gap. When the gap is closed through a reduction in the total height of the spider hub due to the centrifugal forces of high speed rotation, the major stresses are in effect shifted or re-distributed to the horizontal portion of the hub legs. In this way, the stresses are re-distributed as a function of centrifugal force, thereby permitting operation at high rotational velocity without resulting in any permanent metal fatigue in the hub. Further, the pre-stress tension of the hub permits the additional growth, not otherwise available in the metal, allowing the hub to achieve the equivalent growth of the rim which has a lower modulus of elasticity. By means of the present invention, a flywheel rim of 10 inch outer radius and 6 inch inner radius and having a radial displacement as high as 0.312 inches at 32,000 R.P.M., will not separate from the hub.

It is therefore an object of the present invention to provide a one-piece hub/axle that substantially overcomes or reduces the disadvantages of prior art flywheel hubs.

It is another object of the present invention to provide a resilient flywheel hub with pre-stressing that permits increased growth with rotational velocity to equalize the growth of a rim of lower modulus of elasticity.

It is still another object of the present invention to provide a flywheel hub which obviates the requirement for connecting devices between the hub and the rim of the flywheel.

It is still another object of the present invention to provide a flywheel hub which includes a spider leg configuration and height limiting devices to prevent such legs from being overstressed at regions that are subjected to high stress at high angular velocity.

It is still another object of the present invention to provide a hub that is compatible with a flywheel rim of composite fiber material to achieve a flywheel design in which a maximum amount of flywheel mass is located within the outer one-third of the radius of the flywheel and which provides substantially improved dynamic stability.

BRIEF DESCRIPTION OF THE DRAWINGS

Other objects and advantages of the present invention will become apparent from the following detailed description when considered in conjunction with the accompanying drawings in which.

DETAILED DESCRIPTION OF A PREFERRED EMBODIMENT

Figure 1:
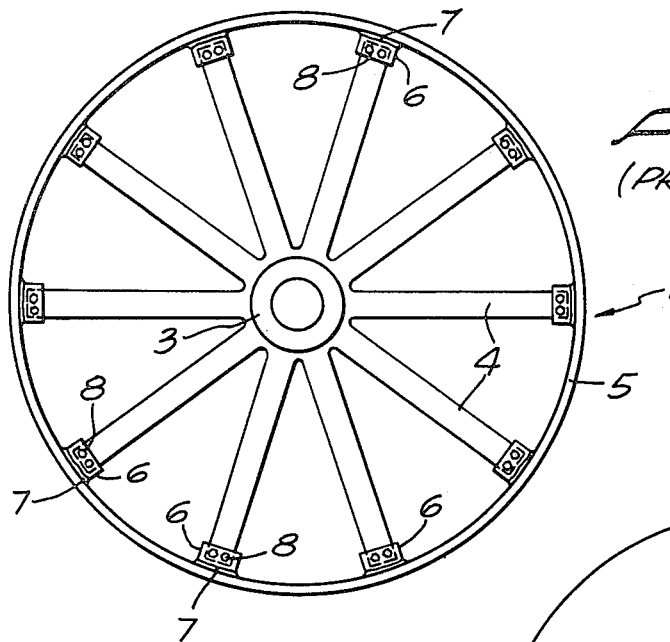
FIG. 1 is an illustration of a prior art flywheel with conventional hub, rim and interconnecting devices.

Referring to the prior art drawing of FIG. 1, there is shown therein a typical example of a prior art flywheel 1 having a hub 3 connected to a rim 5 by means of a plurality of spokes 4 attached to the rim by means of brackets 6 welded or soldered to the rim 5 as indicated at 7 with the end portions of the spokes 4 being fastened to the blocks 6 by means of bolts 8. Thus multi-piece structure, necessitated by the prior art configuration of hub 3, is illustrative of the disadvantageous complexity and commensurate high costs of prior art flywheel hubs. It will be seen hereinafter that the hub of the present invention, by means of its unique unitary design, provides the important advantage, in addition to the others herein set forth, of obviating a need for spokes and any other form of added means for interconnection to a rim.

Figure 2:
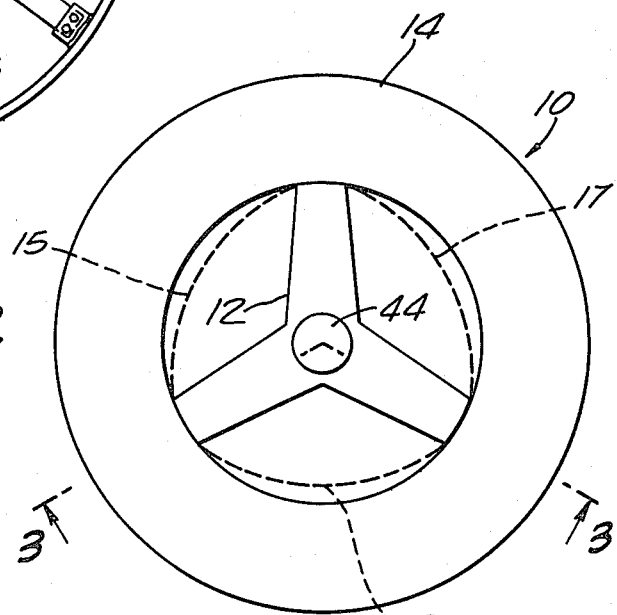
FIG. 2 is a top view of a flywheel in which the novel hub of the present invention is utilized.
Figure 3:
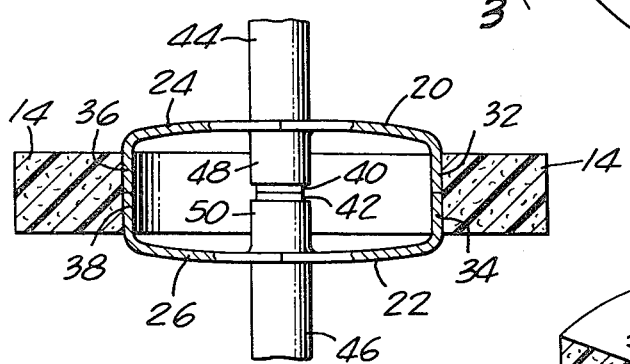
FIG. 3 is a side view of the flywheel shown in FIG. 2 taken along lines 3—3.
Figure 4:
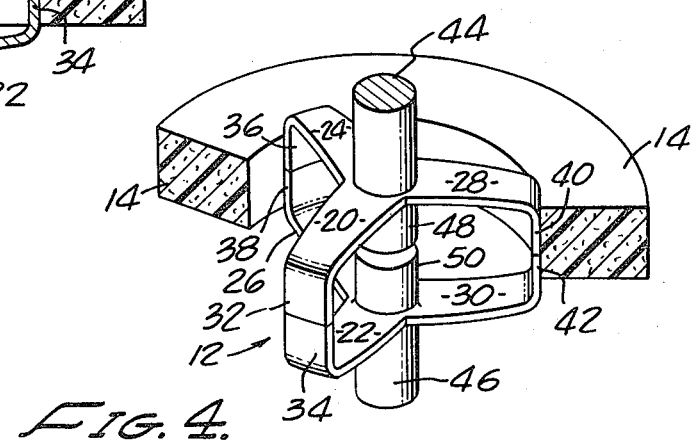
FIG. 4 is an isometric view of a flywheel including the present invention, with the rim being partially cut away.

Referring now to FIGS. 2, 3 and 4, there is shown therein a flywheel 10 in which a hub 12 of the present invention is utilized. FIG. 2 is a top view of a flywheel showing the hub to be a three equi-angular leg structure upon which a rim, 14, of generally cylindrical shape, is supported. FIG. 3, which is a front view of flywheel 10, taken along the lines of 3—3 of FIG. 2, and FIG. 4, which is an isometrical view of the flywheel 10, illustrate that the hub comprises: Axles 44 and 46; height limiting bars 48 and 50; substantially horizontal legs 20, 22, 24, 26, 28 and 30; and substantially vertical legs 32, 34, 36, 38, 40 and 42.

Although hub 12 is designed to be particularly suitable for use with a fiber composite material rim, such as that disclosed in co-pending patent application Ser. No. 942,112 now U.S. Pat. No. 4,285,251, filed concurrently herewith, the present invention relates to the hub per se and is not limited to any particular flywheel rim. By way of example, dotted lines 15, 17 and 19 of FIG. 2 illustrate that the hub of the present invention is also suitable for use with fiber composite material rims that are sub-circular in their stationary configuration to better withstand the stress produced at high rotational velocities.

As seen best in FIGS. 3 and 4, in which the rim is partially cut away to present an unobscured view of the invention, the upper hub legs 20, 24 and 28 are in a generally convex surface and meet the corresponding three lower legs 22, 26 and 30 which are in an oppositely facing convex surface. The three equally spaced top legs meet the corresponding equally spaced lower legs midway in the height of the hub where the respective legs form generally vertical surfaces upon which rim 14 is supported. Because axles 44 and 46 and height limiting bars 48 and 50 are welded or otherwise permanently affixed to the remaining structure of the hub, the hub comprises a unitary structure upon which a rim is mounted. As a result, the costly and complex multi-element structure of the prior art is precluded by the present invention. Thus a highly disadvantageous aspect of prior art hubs, namely, the high material and labor costs associated with fabrication, are substantially diminished by the unitary design of the present invention. Although the ease and relatively lower cost of fabrication of the hub/axle of the present invention is an extremely advantageous feature thereof, it will be recognized below that there is an additional important advantage resulting from the novel design of the invention, which makes it particularly suitable and advantageous for use with flywheel rims fabricated from fiber composite material. However, before proceeding with a discussion of this additionally advantageous feature of the invention, reference will now be made to FIGS. 5 through 8, for the purpose of describing the manner in which the present invention may be fabricated.

Figure 5:
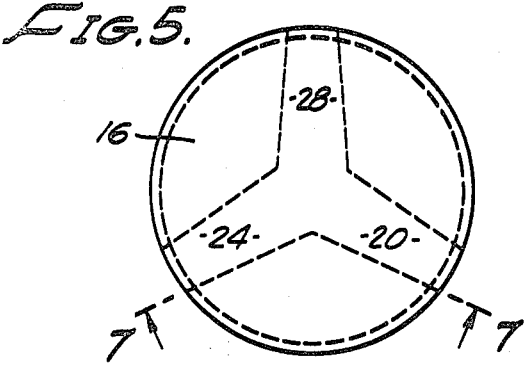
FIGS. 5 and 6 illustrate the domed shaped structure that is used in the manufacture of the hub of the present invention.
Figure 6:
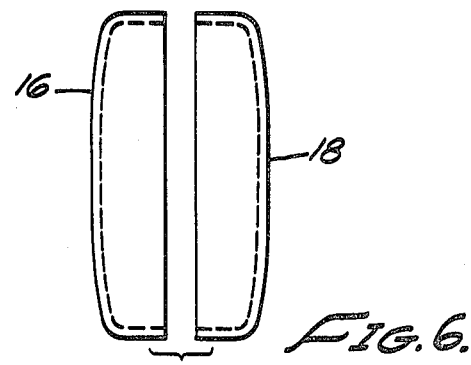
Figure 7:
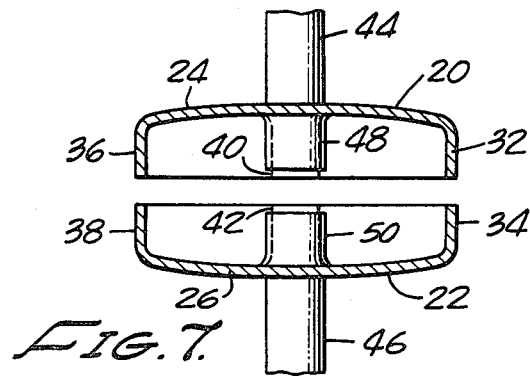
FIGS. 7 and 8 illustrate the manner in which the dome shaped portions of the present invention are each joined to an inner and outer cylindrical bar and also to each other, the domed portions of the invention corresponding to a view taken along lines 7—7 of FIG. 5.

As illustrated in FIGS. 5 and 6, fabrication of the hub of the present invention may begin with selection of two circular pieces of a suitable material such as aluminum ¼ inch flat 7075 T-6 plate stock. The two metallic circular structures are then stamped into generally convex shapes, also referred to as saucepan shapes, or domes, and identified in FIG. 6 as 16 and 18, respectively. Subsequently, as illustrated in FIG. 7, round 7075 T-6 aluminum bar stock of selected dimensions, is affixed at the center of each such saucepan shaped structure on both the convex and concave surfaces at the centers thereof. Affixing the bar stock to the circular plate stock may be accomplished by a relatively new metal working process known as inertia welding.

Interestingly, inertia welding is a metal working process that utilizes flywheel stored kinetic energy. In the inertia welding process, one work piece is fixed in a stationary holding device and the other is clamped in a spindle chuck with a flywheel attached and is accelerated rapidly. At a pre-determined speed, driving power is removed from the spindle chuck and one part is thrust against the other. Friction between the two work pieces, decelerates the flywheel and converts stored energy to frictional heat, which is enough to soften the faces of the parts to be welded. Just before rotation of the flywheel terminates, the two parts bond, and the remaining flywheel energy hot-works the metal interface, expelling impurities or voids and refines the grain structure of the two surfaces that are welded. Further details regarding the inertia welding process, which would be sufficient to enable one skilled in the relevant art to weld the various connected surfaces of the present invention, are available in a publication entitled, "Inertia Welding Application Principles" by Interface Welding of Carson, Calif. Of course, it will be understood that the present invention is not limited to the specific welding process therein described, but only that the embodiment of the invention herein described has been satisfactorily welded by means of the aforementioned process.

Figure 8:
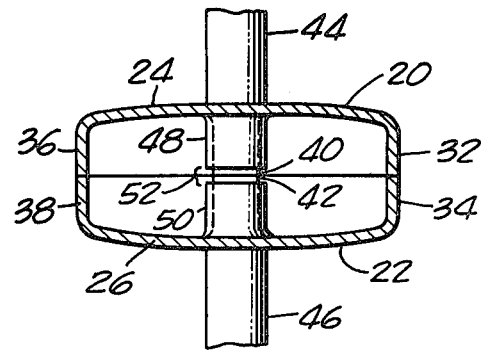

The two resulting structures, namely, two domed shaped configurations of aluminum plate stock, each with pre-selected dimensions of aluminum bar stock welded to the center of the convex and concave surfaces thereof, are in turn, brought together as illustrated in FIG. 7 and welded along the entire interface thereof to form the unitary structure illustrated in FIG. 8.

The two saucepan shaped domes, permanently affixed to each other as a single unit, are then cut in a pattern outlined by dotted lines 13 of FIG. 5, resulting in the double-spider shaped configuration of the completed hub/axle structure. As a result, a majority of the mass of the hub is removed, minimizing the mass located towards the center of the flywheel and thereby increasing the efficiency of inertial energy storage for a given flywheel weight. Furthermore, in the resulting structure, height limiting bars 48 and 50 are separated by a gap 52 of a pre-selected length as shown in FIG. 8. The purpose of gap 52 will be understood from the discussion below in conjunction with FIGS. 9 and 10.

Figure 9:
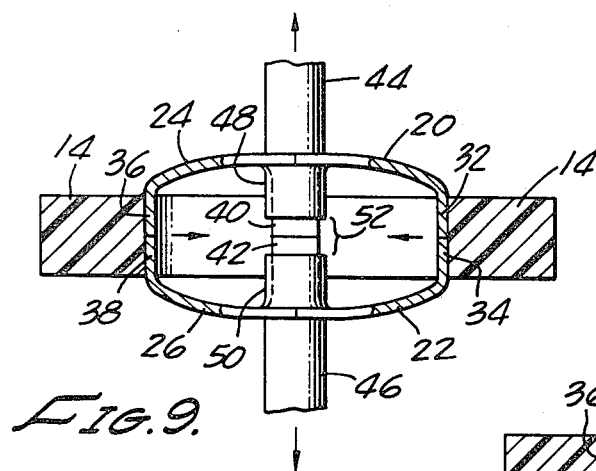
FIG. 9 illustrates the manner in which the hub of the present invention is expanded in height and compressed in diameter when a fiber composite material rim is wound thereon.

As illustrated in FIG. 9, opposing vertical tension forces are applied to axle bars 44 and 46, such as by means of hydraulic pressure. This results in an increase in the overall height of the dome spider-shaped hub and produces a compressive force on the hub legs which moves the vertical portions of the legs towards the center of the hub. As a result, as shown in FIG. 9, gap 52 increases in length as the height limiting bars 48 and 50 are forced into greater separation. It is at this time that a rim 14 is mounted onto the hub. In the case of a rim comprising a fiber composite material, the fiber is mixed with an epoxy matrix, or polymer, and wound onto the hub to form the circular cylindrical structure illustrated in FIG. 9 and allowed to cure with the hub in the illustrated state of tension-effected height increase, so that the completed flywheel comprising the hub/rim combination, is of a slightly reduced diameter in its stationary configuration as illustrated in FIG. 9.

The resulting flywheel configuration with the hub in a state of increased height, permits the hub geometry to change to a far greater degree when subjected to centrifugal forces under high rotational velocity. As a result, the growth incurred by the relatively low modulus of elasticity material comprising the rim 14, is substantially matched by the available increase in growth of the diameter of the hub, thereby precluding destructive separation between the rim and the hub which might otherwise occur. This growth match effect is illustrated in FIG. 10 in which the hub/rim combination is depicted in an extremely high rate of rotation, such as 32,000 revolutions per minute, an anticipated rate of rotation for the embodiment illustrated in the accompanying figures.

Figure 10:
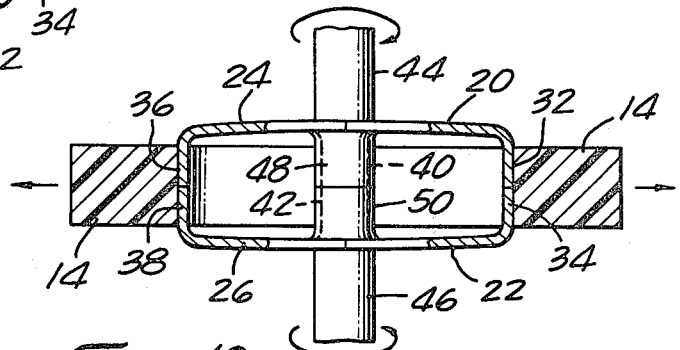
FIG. 10 illustrates the manner in which the hub of the present invention is compressed in height and expanded in diameter as a result of the centrfigual forces incurred during high speed rotation.

As illustrated in FIG. 10, the centrifugal forces resulting from the high rotation, represented by the horizontal oppositely pointing arrows, result in an increase in the diameter of the hub and rim and a decrease in the height of the hub. In fact, as shown in FIG. 10, the height of the hub has decreased to the extent that height limiting bars 48 and 50 have grown towards each other fully eliminating the gap 52 that was present between the bars in their stationary state as indicated in FIG. 9. Because of the built-in growth potential in the stationary hub configuration, the various stresses incurred in the hub as a result of rotation, are re-distributed to prevent destructive metal fatigue. Eventually, the height limiting bars come in contact with one another and thus prevent further reduction in the height of the hub. At this stage, the horizontal portion of the spider legs tend to straighten out and add further to the horizontal growth of the hub configuration.

It will now be understood that by means of the unique pre-stress configuration of the hub of the present invention, as illustrated in FIG. 9, stresses in the hub induced as a result of centrifugal forces generated at high speed rotation, are reversed and re-distributed as a function of the rotational speed so that destructive metal fatigue of the hub is avoided and the overall growth of the diameter of the hub is permitted to match the growth induced in the lower modulus of elasticity material of which the rim may be comprised.

Figure 11:
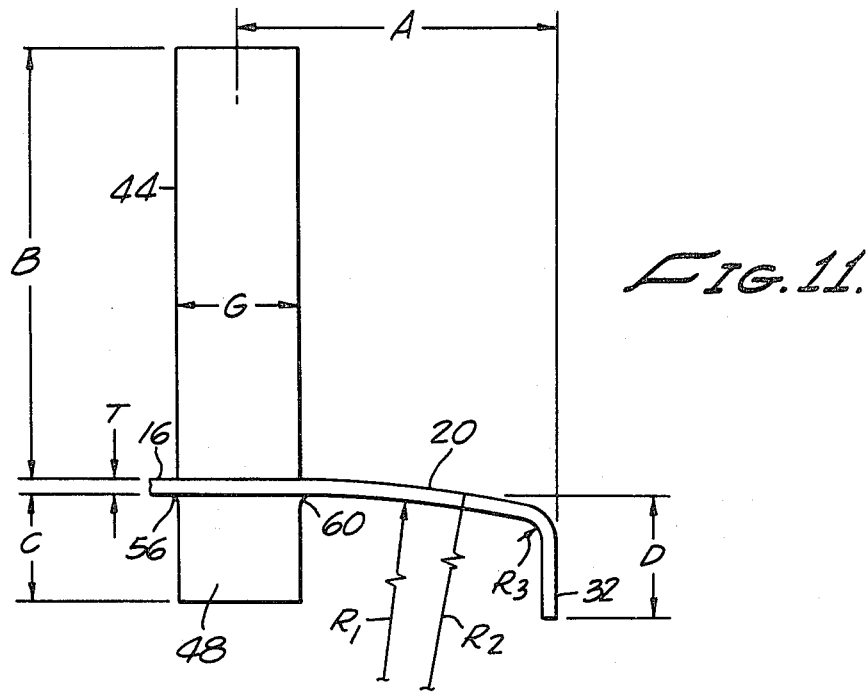
FIG. 11 is an enlarged front view of a portion of one of the domes of the present invention.
Figure 13:
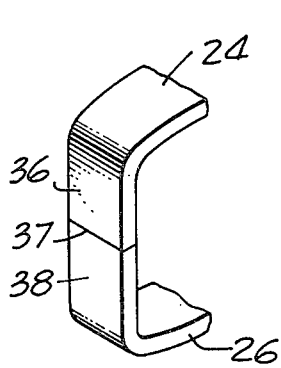
FIG. 13 is an enlarged view of a leg-to-leg interface of the invention taken along lines 13—13 of FIG. 12.
Figure 12:
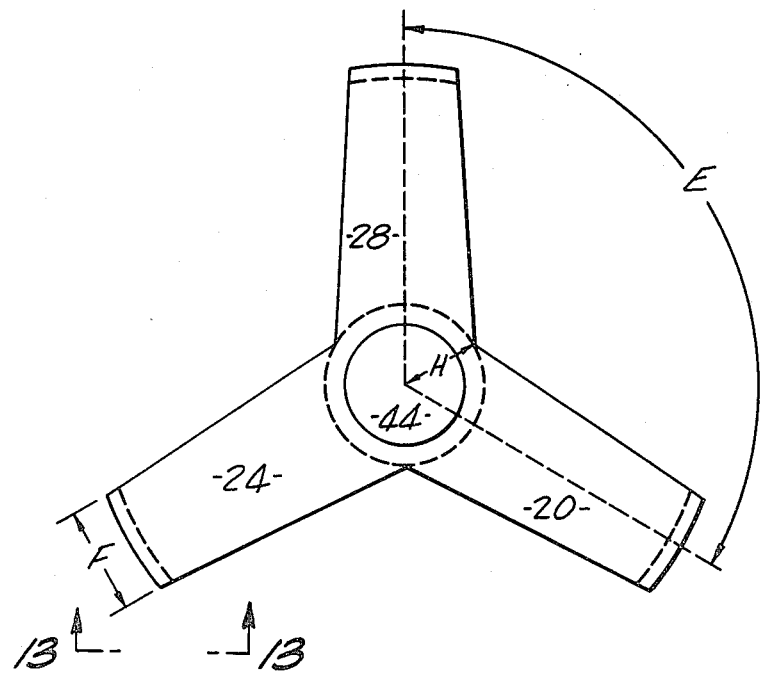
FIG. 12 is an enlarged top view of the invention.

Reference is now made to FIGS. 11, 12 and 13 for a more detailed description of the specific geometrical parameters of a preferred embodiment of the hub of the present invention.

FIG. 11 is an enlarged view of upper dome 16 of the invention, illustrating the geometrical parameters of one embodiment of the hub including substantially horizontal leg 20 and substantially vertical leg 32. In the embodiment illustrated, radius $R_1$ is approximately 23.47 inches, radius $R_2$ is approximately 23.72 inches and radius $R_3$ is approximately 0.5 inches. Furthermore, "T," the thickness of the material, is 0.25 inches, dimension "A" is 6 inches, dimension "B" is 8 inches, dimension "C" is 2 inches, dimension "D" is 2.25 inches, dimension "G" is 2.25 inches. Also shown in FIG. 11 are the flashes of the inertia welding process which, as seen in profile, are identified as flashes 56, and 60, respectively. Flashes 56 and 60 result from the process of welding height limiting bar 48 to dome 16. Similar flashes exist at the junctions of axle bar 46 and height limiting bar 50 with the surfaces of dome 18. Flashes resulting from inertia welding the axle bars 44 and 46 to domes 16 and 18, respectively, are removed in the illustrated embodiment to enhance the appearance.

FIG. 12 is a top view of the embodiment of the hub illustrated in FIG. 11. Hub legs 20, 24 and 28 of the dome 16 and corresponding hub legs 22, 26 and 30 of dome 18, are spaced equally around the circumference of the hub so that dimension "E" corresponds to 120 degrees, which is typical of all the legs. In the indicated embodiment, dimension "F" is 2 inches and dimension "H," which is the radius of the remaining dome about which the legs are oriented, is 1.375 inches.

FIG. 13 is a front view of legs 24 and 26 taken along lines 13—13 of FIG. 12. Vertical legs 36 and 38 meet at a weld junction 37 which is typical of all three sets of legs.

It will now be understood that what has been disclosed herein is a unitary hub/axle structure and method of fabricating such a structure that is suitable for use in conjunction with a fiber composite material rim, in a flywheel kinetic energy storage device.

Although a specific embodiment of the invention has been disclosed herein, it will now be apparent to those having ordinary skill in the art to which the invention pertains that many other embodiments of the invention may be constructed. For example, in view of applicant's teaching herein disclosed, it will now be apparent that there may be variations in materials, dimensions and basic design that would permit substantial deviation from the specific configuration disclosed herein by way of example. Illustrative of such variations is the use of alternative metals or other materials, the use of a number of legs other than the three illustrated herein, and the use of substantially larger dimensions suitable for a flywheel to be used to store tens of thousands of kilowatt-hours of energy so that utility companies could better equalize the energy requirements between maximum and minimum load periods during each 24 hour interval. Such high energy storage flywheels might have an overall diameter of 20 feet or more, in which the hub of the present invention, with essentially the configuration illustrated herein, would have a diameter of approximately 12 feet or more. Accordingly, the invention is not to be limited except as defined by the appended claims.

I claim:

1. A method of fabricating a hub for use in conjunction with a rotating flywheel apparatus for storing kinetic energy, the method comprising the steps of:

interconnecting a pair of opposed, coaxial, convex surfaces of substantially equal dimensions, each such surface having an equal plurality of legs spaced equidistantly around the periphery thereof at locations corresponding to the locations of the legs of the opposing surface;

said legs of said respective convex surfaces abutting to form a plurality of arcuate radially outward facing surfaces for support of a cylindrical flywheel rim, the axis of which is collinear with the axes of said convex surfaces;

affixing an axle, coaxially, to each of said convex surfaces upon the outer face thereof; and affixing a height limiting device, coaxially, to each of said convex surfaces upon the inner face thereof, wherein said devices are collinearly spaced from one another to form a gap of pre-selected length therebetween.

2. The method of fabricating a hub as defined in claim 1, in which said axles and said height limiting devices are affixed to the respective surfaces by inertia welding.

3. A method of fabricing a flywheel apparatus for storing kinetic energy, the method comprising the steps of:

interconnecting a pair of opposed, coaxial, convex surfaces of substantially equal dimensions, each such surface having an equal plurality of legs spaced equidistantly around the periphery thereof at locations corresponding to the locations of the legs of the opposing surface, said legs of said respective convex surfaces abutting to form a plurality of arcuate radially outward facing surfaces for support of a cylindrical flywheel rim, the axis of which is collinear with the axes of said convex surfaces;

affixing an axle, coaxially, to each of said convex surfaces upon the outer face thereof;

affixing a height limiting device, coaxially, to each of said convex surfaces upon the inner face thereof, wherein said devices are collinearly spaced from one another to form a gap of pre-selected length therebetween;

placing said hub in a state of axial tension that reduces the diameter of said hub and increases the distance between said convex surfaces by pre-selected amounts;

winding a fiber composite material around the legs of said hub along the radially outward facing surface of each such leg to form a flywheel rim thereon; and releasing said hub from said state of axial tension.

4. The method of fabricating a flywheel apparatus as defined in claim 3, comprising the additional step of: constraining said fiber composite material during said winding so that said rim is substantially circular in shape.

5. The method of fabricating a flywheel apparatus as defined in claim 3, comprising the additional step of: constraining said fiber composite material during said winding so that said rim is substantially non-circular in shape.

* * * * *